(12) United States Patent
Zhou

(10) Patent No.: US 9,574,596 B2
(45) Date of Patent: Feb. 21, 2017

(54) SELF-LOCKING DEVICE AND LOCKING AND UNLOCKING EQUIPMENT THEREOF

(76) Inventor: Lixin Zhou, Handan (CN)

(*) Notice: Subject to any disclaimer, the term of this patent is extended or adjusted under 35 U.S.C. 154(b) by 228 days.

(21) Appl. No.: 13/978,495

(22) PCT Filed: Jan. 4, 2012

(86) PCT No.: PCT/CN2012/070027
§ 371 (c)(1),
(2), (4) Date: Sep. 18, 2013

(87) PCT Pub. No.: WO2012/092856
PCT Pub. Date: Jul. 12, 2012

(65) Prior Publication Data
US 2014/0286730 A1     Sep. 25, 2014

(30) Foreign Application Priority Data

Jan. 6, 2011 (CN) .......................... 2011 1 0020106
Jan. 6, 2011 (CN) ..................... 2011 2 0017247 U
(Continued)

(51) Int. Cl.
*F16B 21/07* (2006.01)
*F16L 21/06* (2006.01)
(Continued)

(52) U.S. Cl.
CPC ............. *F16B 21/073* (2013.01); *B25B 27/00* (2013.01); *B25B 31/00* (2013.01); *B60B 11/10* (2013.01);
(Continued)

(58) Field of Classification Search
CPC ........ F16L 37/092; F16L 21/007; F16L 21/06; F16B 21/073; B25B 27/00; B25B 31/00
(Continued)

(56) References Cited

U.S. PATENT DOCUMENTS

| 5,378,075 | A | 1/1995 | Mitchell |
| 2008/0023616 | A1* | 1/2008 | Arakawa ............... A47F 5/0892 |
| | | | 248/489 |

FOREIGN PATENT DOCUMENTS

| CN | 2509364 | 10/2001 |
| DE | 102007060084 | 6/2009 |
| EP | 1529965 | 5/2005 |

OTHER PUBLICATIONS

International Search Report in parent PCT Application PCT/CN2012/070027, mailed Mar. 29, 2012.

* cited by examiner

Primary Examiner — Abigail Morrell

(57) ABSTRACT

A self-locking device with continuous locking positions includes a housing with an internal cavity, a wall of the cavity including a first frictional contact face and a fourth frictional contact face; a locking member with a second frictional contact face and a third frictional contact face, which is movable in the cavity, with the second and third frictional contact faces facing the first and fourth frictional contact faces, respectively; and a first lock block and a second lock block, with the first lock block being arranged between and contacting with the first and second frictional contact faces, and the second lock block being arranged between and contacting with the third and fourth frictional contact faces. The first and second lock blocks allow the locking member to be movable with respect to the housing in a first direction but locked in a second direction opposite to the first direction.

13 Claims, 17 Drawing Sheets

(30) Foreign Application Priority Data

Jan. 6, 2011 (CN) .................... 2011 2 0017252 U
May 31, 2011 (CN) ........................ 2011 1 0143416
May 31, 2011 (CN) ........................ 2011 1 0143418

(51) Int. Cl.
| | |
|---|---|
| *F16L 21/00* | (2006.01) |
| *B25B 27/00* | (2006.01) |
| *B25B 31/00* | (2006.01) |
| *B60C 17/01* | (2006.01) |
| *B60B 23/04* | (2006.01) |
| *B60B 23/10* | (2006.01) |
| *B60B 25/20* | (2006.01) |
| *B66F 7/24* | (2006.01) |
| *B60B 11/10* | (2006.01) |
| *B60B 29/00* | (2006.01) |

(52) U.S. Cl.
CPC .............. *B60B 23/04* (2013.01); *B60B 23/10* (2013.01); *B60B 25/20* (2013.01); *B60B 29/003* (2013.01); *B60C 17/01* (2013.01); *B66F 7/243* (2013.01); *F16L 21/007* (2013.01); *F16L 21/06* (2013.01)

(58) Field of Classification Search
USPC .............................. 24/136 A; 385/316, 317
See application file for complete search history.

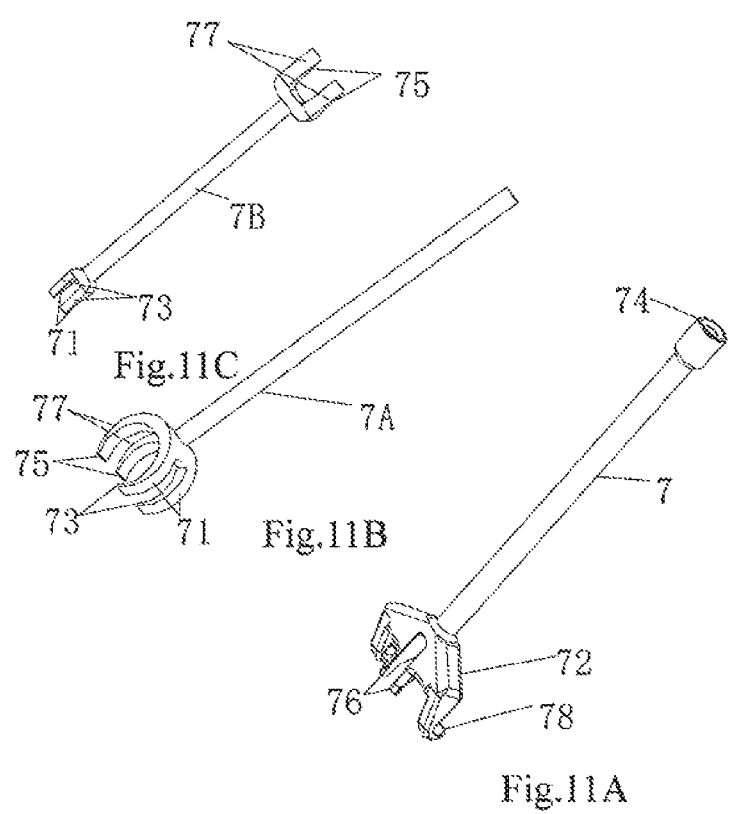

SELF-LOCKING DEVICE AND LOCKING AND UNLOCKING EQUIPMENT THEREOF

CROSS-REFERENCE TO RELATED APPLICATIONS

This application claims the priorities of Chinese patent applications No. 201110020106.4 filed Jan. 6, 2011 and titled "Fast mounting and demounting system for supplementary wheel used for motor vehicle", No. 201120017252.7 filed Jan. 6, 2011 and titled "Fast mounting and demounting system for supplementary wheel used for motor vehicle", No. 201120017247.6 filed Jan. 6, 2011 and titled "Locking device featured by fast mounting and demounting and tool therefor", No. 201110143418.4 filed May 31, 2011 and titled "Wheel and a wheel mounting and demounting system", and No. 201110143416.5 filed May 31, 2011 and titled "Fastener and mounting and demounting equipment for the same", which are incorporated herein by reference in their entirety.

FIELD OF THE INVENTION

The invention relates to a self-locking device and a locking and unlocking equipment therefor.

BACKGROUND OF THE INVENTION

The existing fastener may be locked by a screw, a buckle, a pin, etc., to fasten objects in position. If the relative positions of the fastened objects are improper, however, the fastener needs to be unlocked, and then locked again after the positions of the objects are adjusted properly, which is timing consuming and strenuous. For example, fasteners (e.g. construction fasteners) are used for connecting pipes (e.g. metal pipes) to build a falsework in the construction field. These fasteners are locked by screws to fasten the pipes, which is timing consuming, strenuous and inefficient.

To address this problem, a self-locking fastener, which includes a ratchet wheel and a detent or locking teeth, is proposed in the prior art, but is defective for a retracting stroke during its locking and for discontinuous self-locking instead of continuous self-locking, which degrades its locking effect.

SUMMARY OF THE INVENTION

An object of the invention is to provide a self-locking device, particularly but not limited to, a construction fastener, and a locking and unlocking equipment for the self-locking device, to address the above problem. The inventive self-locking device, which is convenient for use, may be used for quickly locking an object to be fastened with a good locking effect. For example, the locking or unlocking of the inventive construction fastener may be achieved in a few seconds.

In an aspect, a self-locking device with continuous locking positions includes: a housing with an internal cavity, where a wall of the cavity includes a first frictional contact face; a locking member with a second frictional contact face, which is arranged at least partially in the cavity, with the second frictional contact face facing the first frictional contact face; and a lock block, which is arranged between and contacts with the first and second frictional contact faces; where, the lock block allows the locking member to be movable with respect to the housing in a first direction but locked in a second direction opposite to the first direction, so that the locking member is locked at any continuous locking position.

In another aspect, a self-locking device with continuous locking positions includes: a housing with an internal cavity, where a wall of the cavity includes a first frictional contact face and a fourth frictional contact face; a locking member with a second frictional contact face and a third frictional contact face, which is movable in the cavity, with the second and third frictional contact faces facing the first and fourth frictional contact faces, respectively; and a first lock block and a second lock block, with the first lock block being arranged between and contacting with the first and second frictional contact faces, and the second lock block being arranged between and contacting with the third and fourth frictional contact faces; where, the first and second lock blocks allow the locking member to be movable with respect to the housing in a first direction but locked in a second direction opposite to the first direction, so that the locking member is locked at any continuous locking position. Here, four frictional contact faces and two lock blocks are adopted for achieving a better locking effect comparing with the case where only one lock block and two frictional contact faces are adopted.

In a further aspect, there is provided a tool for locking and unlocking the above self-locking devices, which applies a force on the self-locking device to lock and unlock the device.

The tool has a stick shape, one end of the tool is an unlocking end for unlocking the self-locking device, and the other end of the tool is a locking end for locking the self-locking device, wherein the unlocking end is provided with two parallel bent hooks for hooking fixed parts of the housing of the self-locking device to allow the tool to be rotated about the fixed parts; two protrusions are arranged between the bent hooks for pressing the lock blocks of the self-locking device during the rotation; and the locking end is provided with a concave.

Alternatively, the tool has a stick shape, and each of two ends of the tool is provided with a pair of pawls with a different interval.

Alternatively, the tool has stick shape, and one end of the tool is provided with two pairs of pawls with different intervals, with one pair of pawls facing the other pair of pawls.

The continuous self-locking of the inventive device is achieved by the lock blocks(s) and the frictional contact faces, thus achieving a better locking effect comparing with the discontinuous locking in the prior art. Further, the inventive device is easy to unlock, and its operative efficiency is significantly improved due to its simple operations. For example, the locking and unlocking of the inventive device may be achieved in much short time comparing with the fasteners in the prior art, so that a falsework may be built quickly. Further, the inventive device operates stably, and may undertake a large load and a dynamic load.

In the prior art, any construction fastener relying on a screw connection is very demanding for the alignment of screw holes for the purpose of the screw connection, and hence is demanding for a high size precision and manufacturing processes of various components of the fastener, leading to increased manufacturing costs. In the invention, however, the locking member is used for mutual fastening of various components without demanding for the above high size precision, therefore the inventive device may be manufactured easily at a low cost.

The inventive device works at a low noise level.

For a better locking effect of the lock block(s), the self-locking device may further include a holding member including one or more compression springs which apply forces on the lock block(s), to ensure the contact between each lock block and respective two frictional contact faces.

The inventive self-locking device is advantageous for its continuous self-locking and/or fastening, i.e. locking and/or fastening at any position, so that the locking and/or fastening of the inventive self-locking device may be performed with an improved precision and the locking and unlocking of the inventive self-locking device may be performed within much less time in comparison with screwing.

The problem of retracting stroke that exists in ratchet wheels and teeth does not happen to the self-locking device, which may be used for locking an object without any retracting stroke, so that the locking and/or fastening precision is improved.

BRIEF DESCRIPTION OF THE DRAWINGS

The accompanying drawings, which form a part of the application, are intended to provide further understanding of the invention. Illustrative embodiments of the invention are intended to explain, but not to limit, the invention.

FIGS. 11A-11C show dedicated tools of the invention.

DETAILED DESCRIPTION OF THE EMBODIMENTS

The invention is described below referring to the accompanying drawings and embodiments. The embodiments or features in embodiments may be combined without conflict.

Self-Locking Device of a First Embodiment

The self-locking device in the first embodiment includes a housing 1 with a cavity, a locking member 2 and a lock block 3, and preferably further includes a holding member. The lock block 3 may have a spherical or elliptic shape, for example. The holding member may include a spring and a spring retainer (which may be a part of the housing). The wall of the cavity of the housing 1 includes a frictional contact face (i.e. locking face) W and the locking member includes a frictional contact face M.

The structure and operation principles of the self-locking device in the first embodiment are described as follows. The above two frictional contact faces form an angle α, with the lock block being sandwiched between the faces. A spring may be provided to apply a pretightening force on the lock block along a direction from the lock block towards the vertex of the angle α, so that the lock block may be kept in contact with the frictional contact faces, and the locking member may be locked by the lock block which is in frictional contact the two frictional contact faces. If a force opposite to the pretightening force of the spring is applied to the lock block to separate the lock block from the frictional contact faces, the lock block is released and hence the locking member is unlocked. That is, the locking member can be unlocked by applying an external force to the lock block.

The theory about self-locking of the self-locking device in the first embodiment is described below.

Figure 1A:
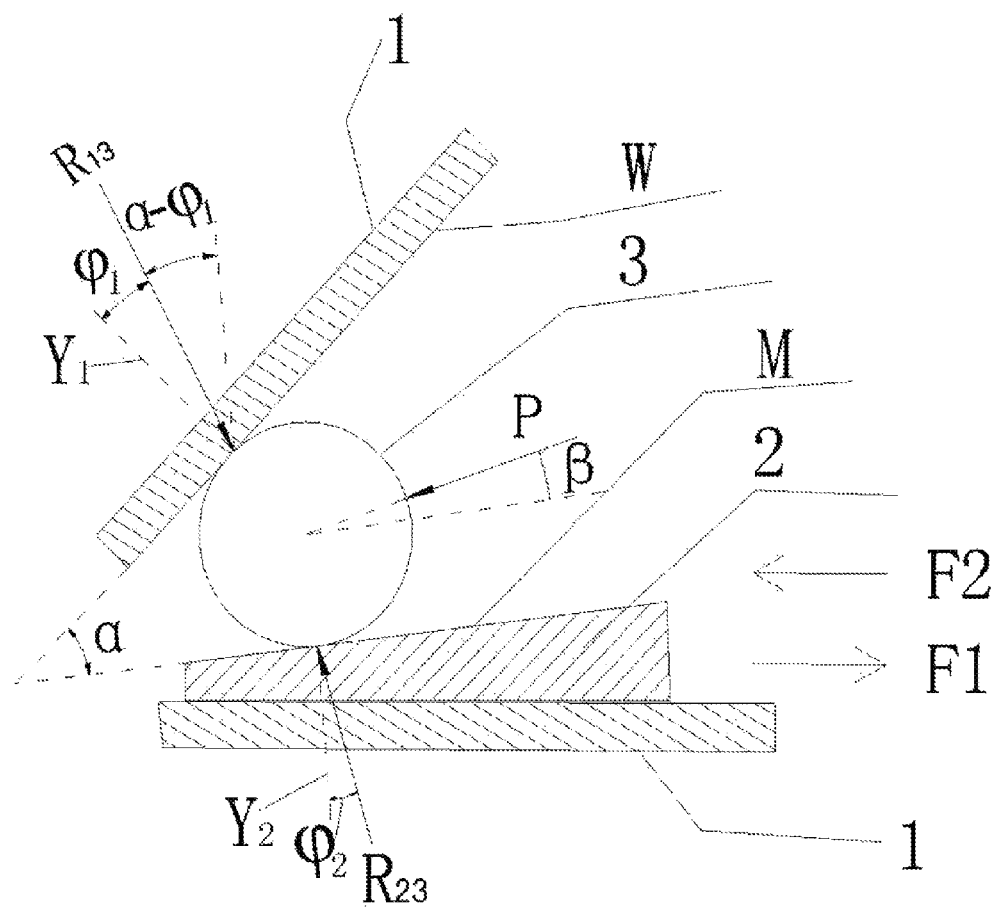
FIG. 1A shows principles of a self-locking device in a first embodiment of the invention.

As shown in FIG. 1A, a force applied to the lock block 3 by the (first) frictional contact face W is denoted by R13, a force applied to the lock block 3 by the (second) frictional contact face M is denoted by R23, the pretightening force P, which is at an angle β with respect to the first frictional contact face, is applied to the lock block 3 by a spring, the first frictional contact face W is at an angle α with respect to the second frictional contact face M, a frictional angle and a friction factor between the lock block and the first frictional contact face W are denoted by $\phi_1$ and $\mu_1$, respectively, and a frictional angle and a friction factor between the lock block and the second frictional contact face M are denoted by $\phi_2$ and $\mu_2$, respectively, where $\mu_1 = \tan \phi_1$ and $\mu_2 = \tan \phi_2$. The normals of the first and second frictional contact faces are denoted by $Y_1$ and $Y_2$, respectively.

As desired, the friction factor between the lock block 3 and the first frictional contact face may be the same as or different from that between the lock block 3 and the second frictional contact face. Components of the self-locking device may be made of the same or different materials (e.g. metal, plastic, ceramic) as desired, even the same component may be made of several materials.

Figure 1B:
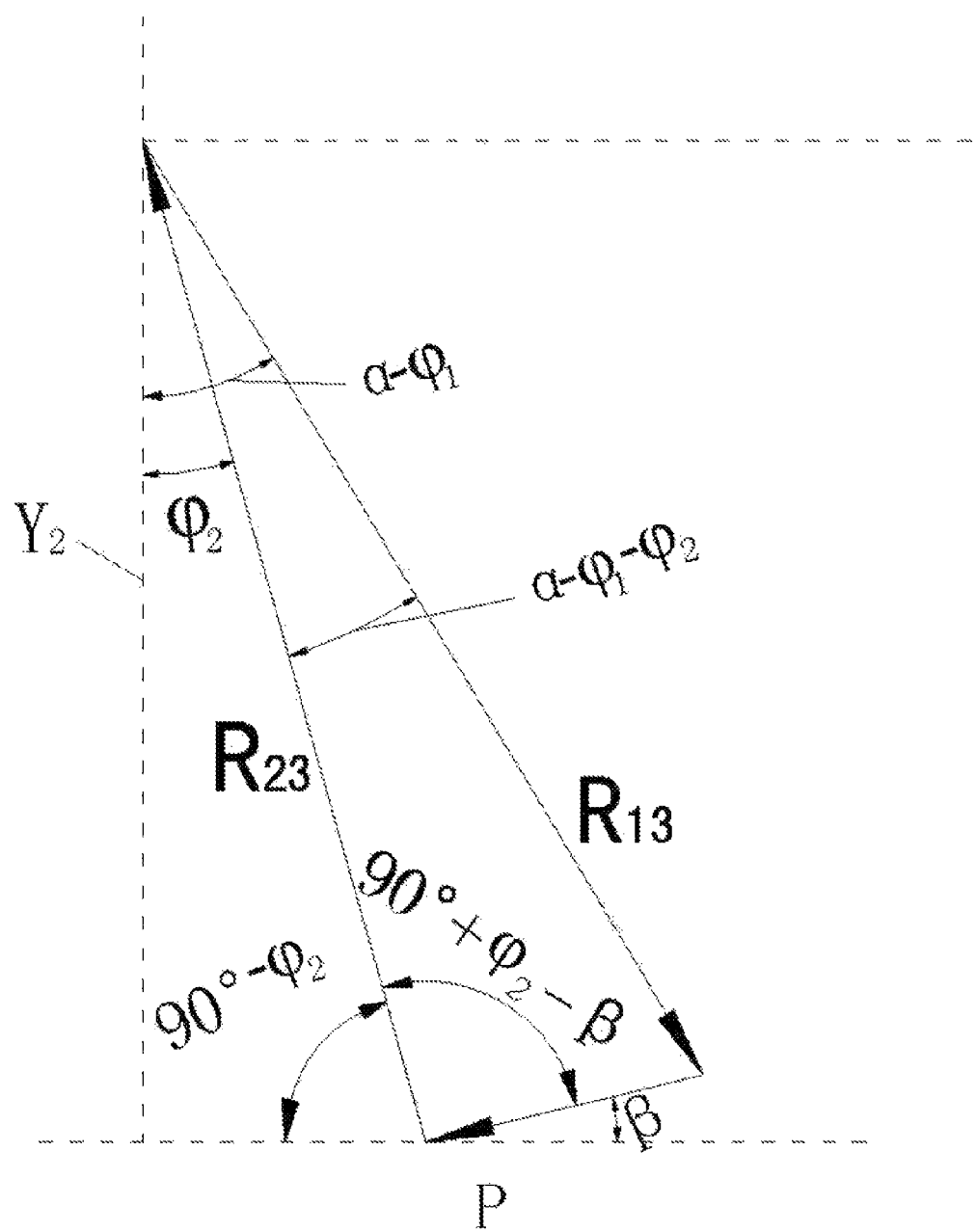
FIG. 1B shows a force triangle illustrating the principles of the self-locking device in the first embodiment of the invention.

According to such a criterion that the generated resistance is less than or equal to zero in the case of reversal of stroke, as shown in FIG. 1B, a self-locking condition is determined as follows.

$$\frac{R_{13}}{\sin(90° + \varphi_2 - \beta)} = \frac{P}{\sin(\alpha - \varphi_1 - \varphi_2)},$$

that is, $$P = R_{13} \frac{\sin(\alpha - \varphi_1 - \varphi_2)}{\cos(\varphi_2 - \beta)},$$

therefore, to prevent the release of the lock block from the first and second frictional contact faces, P shall be less than or equal to 0. Considering $-90° < \varphi_2 - \beta < 90°$, then $\cos(\varphi_2 - \beta) > 0$, and hence $\alpha \leq \varphi_1 + \varphi_2$, i.e. the condition for self-locking.

That is, if the angle α is less than or equal to the sum of the frictional angles $\varphi_1$ and $\varphi_2$, the locking member is allowed to be moved in a first direction F1 with respect to the housing, but locked in a second direction opposite to the first direction, so that the locking member can be continuously locked, i.e. locked at any of continuous locking positions.

If the self-locking device is made of steel, the frictional angles $\varphi_1 = \varphi_2 = 8.5°$ since the friction factor of steel is about 0.15, thus the angle α is less than about 17°. However, the self-locking device may be made of any other suitable material, and even the same component of the device may be made of various materials.

Based on the operation principle of the self-locking device in the first embodiment, it is possible to combine multiple, e.g. two, self-locking devices as desired.

Figure 1C:
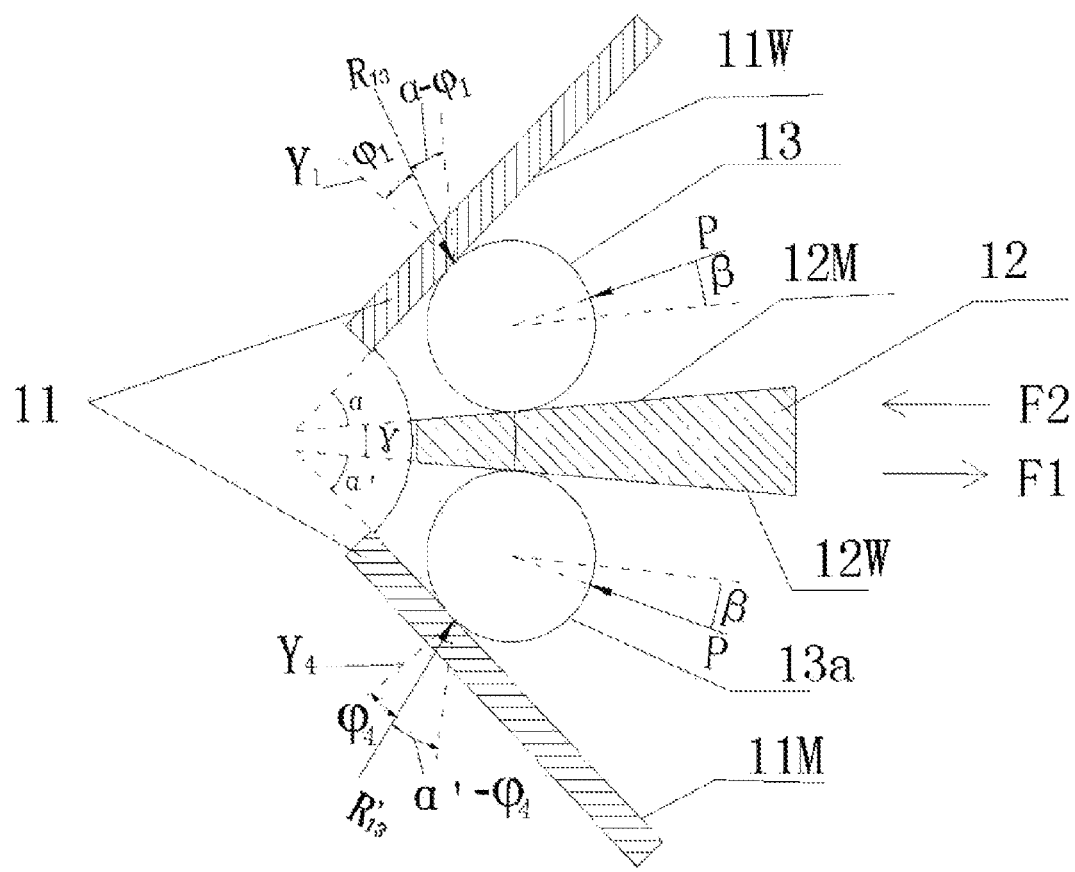
FIGS. 1C-1D respectively show structures and principles of the self-locking device in a second and a third embodiments of the invention.
Figure 1D:
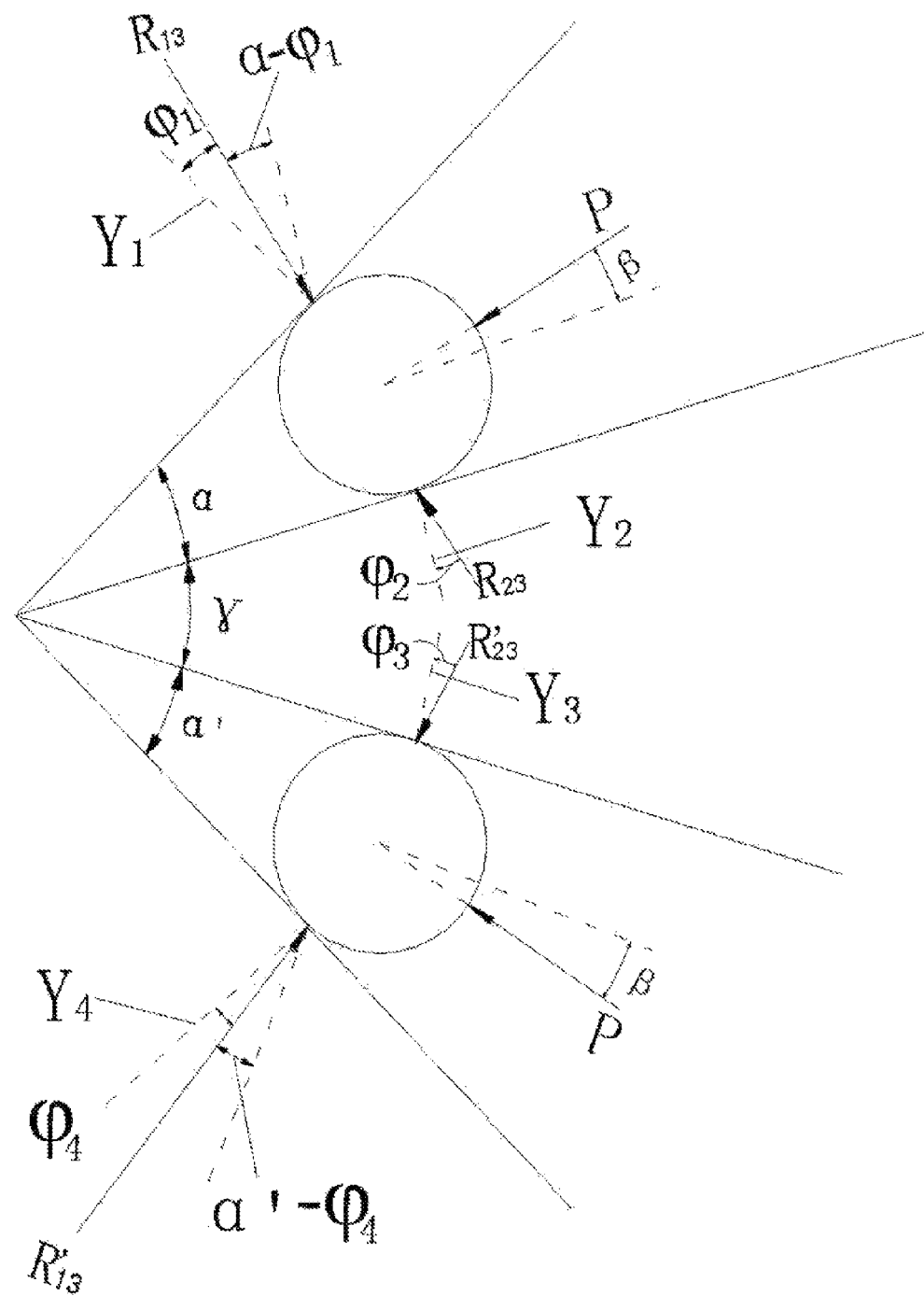
Figure 2A:
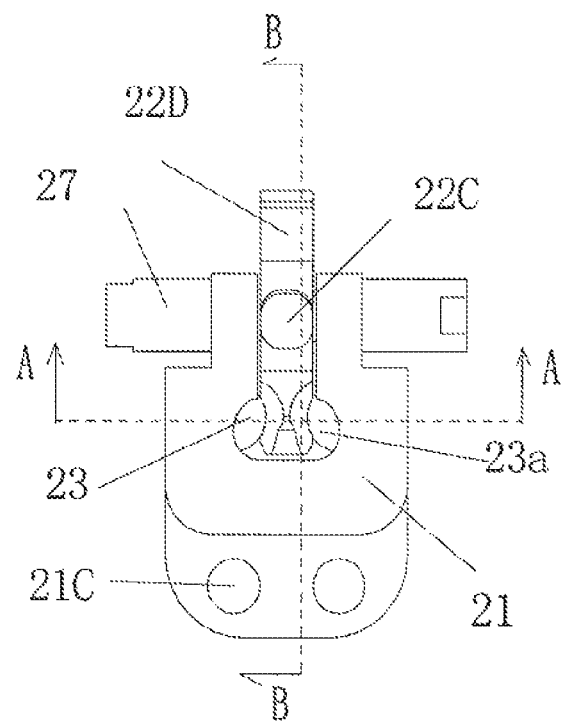
FIGS. 2A-2B show a front view and a sectional view along a line A-A of the self-locking device in the second embodiment, respectively.
Figure 2B:
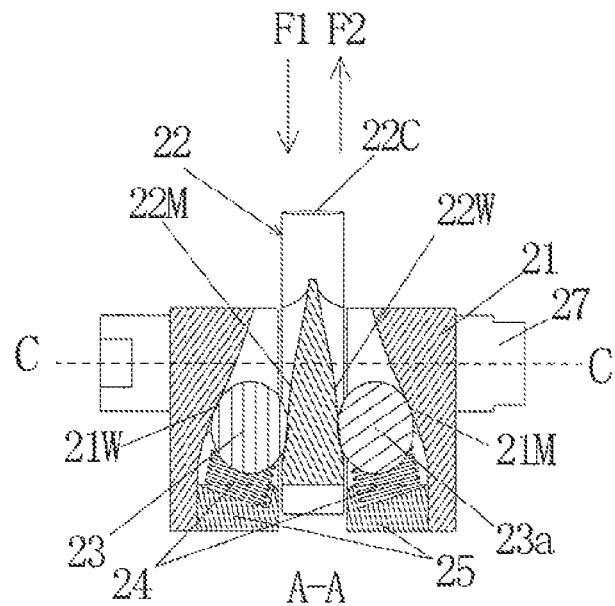
Figure 2C:
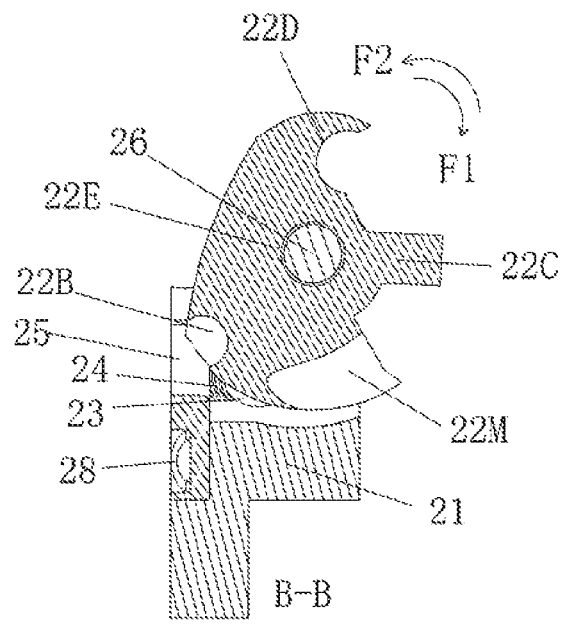
FIGS. 2C-2D show sectional views along lines B-B and C-C of the self-locking device in the second embodiment, respectively.
Figure 2D:
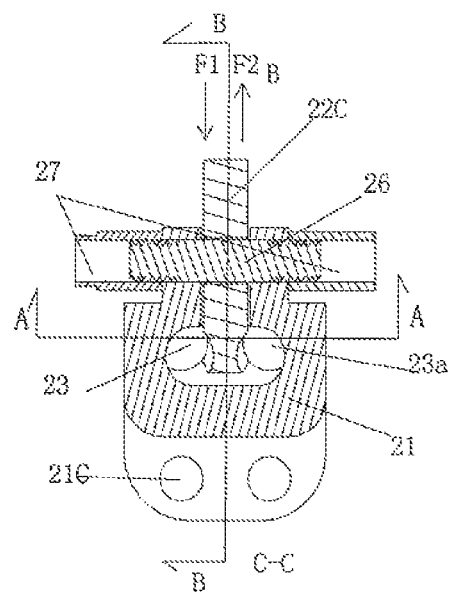

FIGS. 1C-1D show the structure and operation principle of the inventive self-locking device in the second and third embodiments.

Four frictional contact faces 11W, 12M, 12W, 11M, two lock blocks (i.e. a first lock block and a second lock block) 13, 13a, and a holding member (which may include two springs) are provided in the self-locking device of the first or second embodiment.

The pretightening force P is at an angle β with respect to the second frictional contact face 12M, the first and second frictional contact faces (11W, 12M) form an angle $\alpha \leq \varphi_1 + \varphi_2$, where $\varphi_1$ denotes the frictional angle between the first lock block and the first frictional contact face 11W and $\varphi_2$ denotes the frictional angle between the first lock block and the second frictional contact face 12M. The third and fourth frictional contact faces (12W, 11M) form an angle $\alpha' \leq \varphi_3 + \varphi_4$, where $\varphi_3$ denotes the frictional angle between the second lock block and the third frictional contact face and $\varphi_4$ denotes the frictional angle between the second lock block and the fourth frictional contact face. The angle between the second and third frictional contact faces (12M, 12W) is denoted by γ, and the angle between the first and fourth frictional contact faces (11W, 11M) is denoted by θ, then $\theta \leq \varphi_1 + \varphi_2 + \varphi_3 + \varphi_4 + \gamma$, so that the locking member is allowed to be moved in the first direction F1 by an external force, but locked stably in a second direction F2 opposite to the first direction F1. The above angles may be designed according to the above principles, so that the locking member can be locked at any of continuous locking positions by the lock blocks.

FIGS. 2A-2D show the structural representation of a preferable example of the self-locking device in the second embodiment. The self-locking device in the second embodiment includes a housing 21, a locking member 22, an optional holding member (including springs 24) and two lock blocks 23, 23a, and preferably includes spring retainers 25, a pin 26, nuts 27, and screws 28 for fixing the spring retainers.

The housing 21 further functions for mounting of other components and/or itself. The locking member 22 is rotatably connected in the internal cavity of the housing 21 through the pin 26. The wall of the internal cavity of the housing 21 includes two locking faces 21W and 21M (which are equivalent to the first and fourth frictional contact faces 11W, 11M shown in FIGS. 1C-1D) and the spring retainers 25 are provided in the housing 21, preferably as a part of the housing 21. The housing 21 may be fixed to an external object such as a clamp by screw holes 21C, or formed integrally with the clamp.

The locking member 22 includes two side locking faces 22M and 22W (which are equivalent to the second and third frictional contact faces 12M and 12W shown in FIGS. 1C-1D). The locking faces 22M and 22W may have a flat shape, or a partial annular shape (the center of which is the central hole 22E of the locking member 22, as shown in the B-B sectional view of FIG. 2C), or any other shape facilitating the rolling or sliding of the lock blocks 23 and 23a on the locking faces. Preferably, the locking faces 21W and 22M and the locking faces 22W and 21M are shaped to substantially complementary with the lock block 23 or 23', to increase the contact area between the locking faces and the lock block 23 or 23'. The locking faces 21W and 21M in the housing 21 are designed such that the vertex of an angle α between the locking faces 21W and 22M or the vertex of an angle α' between the locking faces 21M and 22W (i.e. the angle between two frictional contact faces contacting with the same lock block) points substantially along the direction F1. If the side locking faces 22W and 22M of the locking member 22 form an angle γ, then the angle θ between the locking faces 21W and 21M meets a condition of $\theta \leq \varphi_1 + \varphi_2 + \varphi_3 + \varphi_4 + \gamma$, to achieve the locking of the locking member, that is, the locking member 22 can be rotated along the direction F1 but not in the opposite direction F2. Only if any of the lock blocks is released or separated from any of the frictional contact faces by the effect of an external force, the locking member can be unlocked and then moved in the direction F2. Two open grooves 22B are provided in the two side locking faces of the locking member 22, and the lock blocks are positioned at the grooves 22B before the use of the self-locking device 22, to facilitate the use and improve the use efficiency of the device.

Figure 5A:
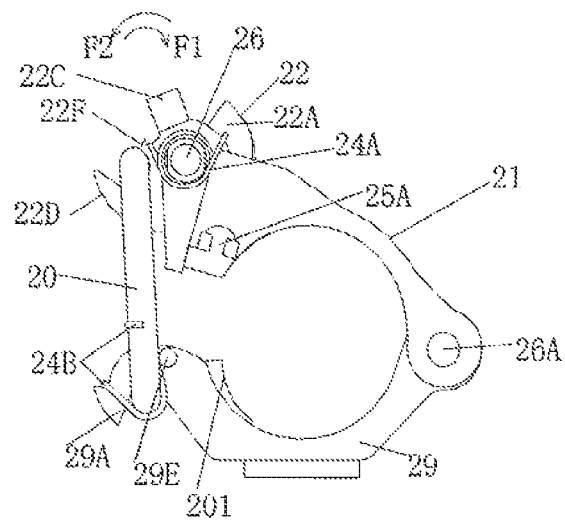
FIG. 5A shows a front view of a construction fastener embodying the self-locking device in the second embodiment.
Figure 5B:
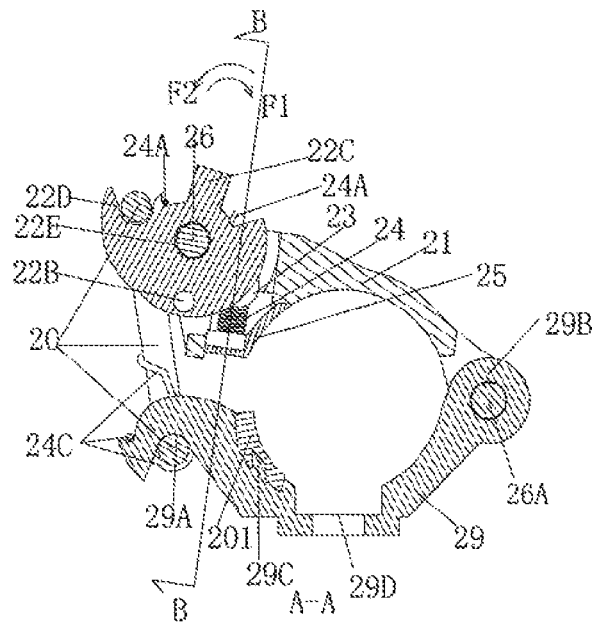
FIGS. 5B-5C show sectional views along lines A-A and B-B of the fastener embodying the self-locking device in the second embodiment, respectively.
Figure 5C:
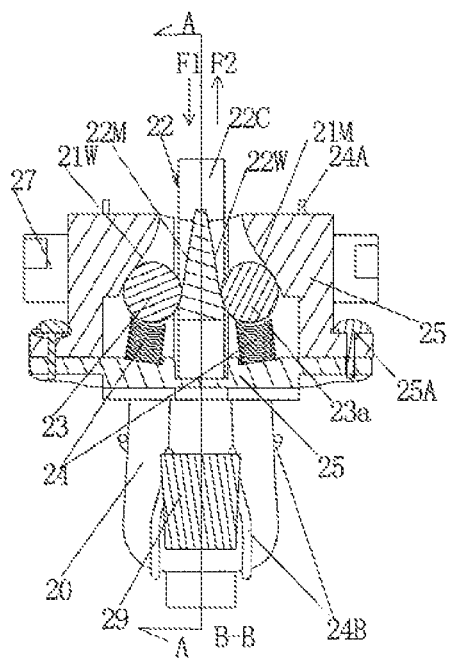
Figure 6A:
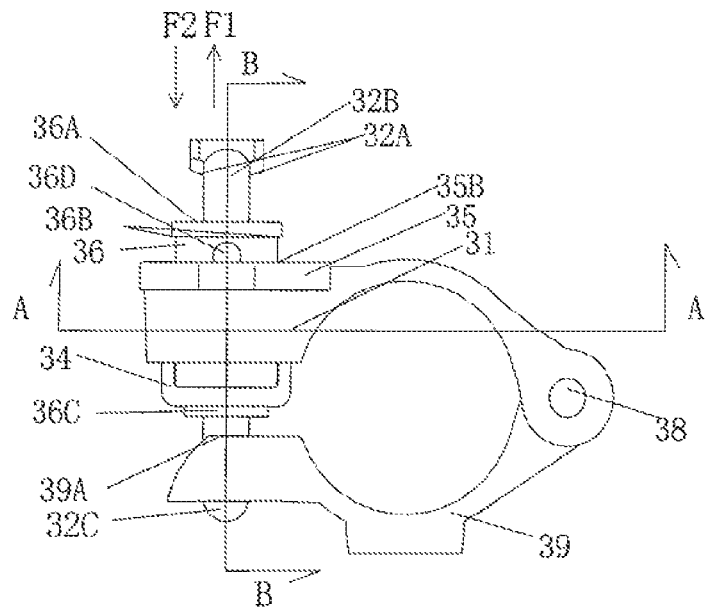
FIGS. 6A-6F show a front view, a top perspective view, a bottom perspective view, a sectional view along a line A-A, a sectional view along a line B-B, and a sectional view along a line C-C of a variant of the fastener embodying the self-locking device of an embodiment.
Figure 6B:
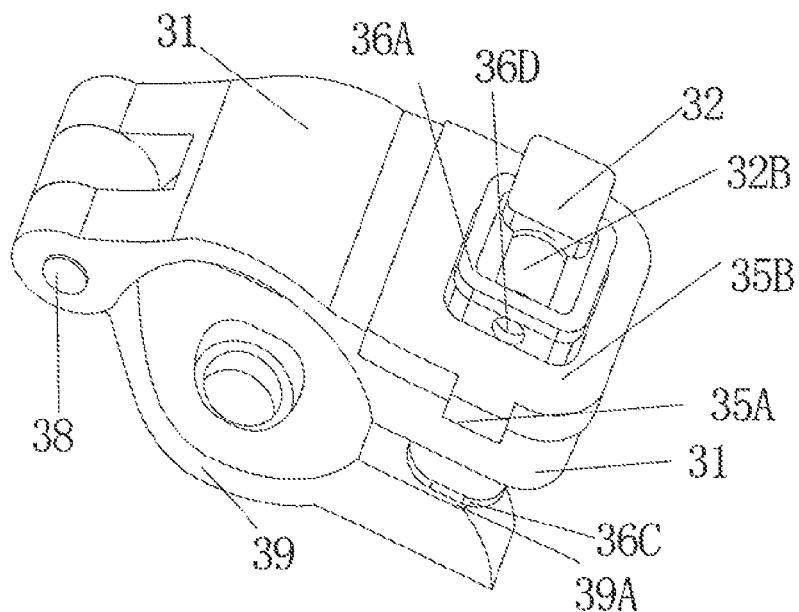
Figure 6C:
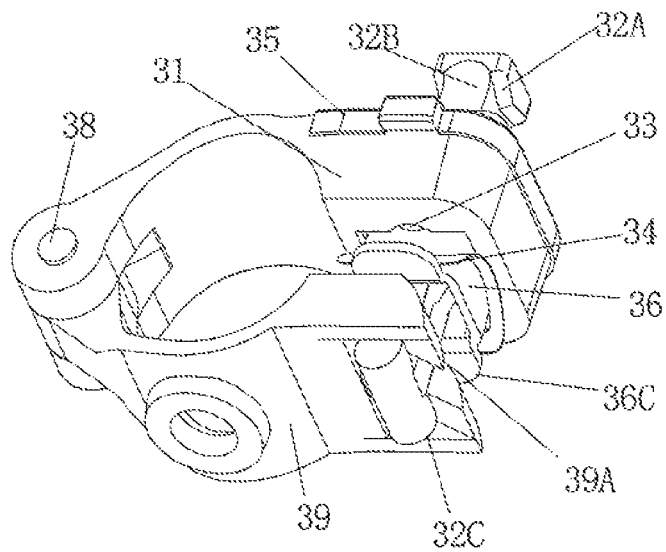
Figure 6D:
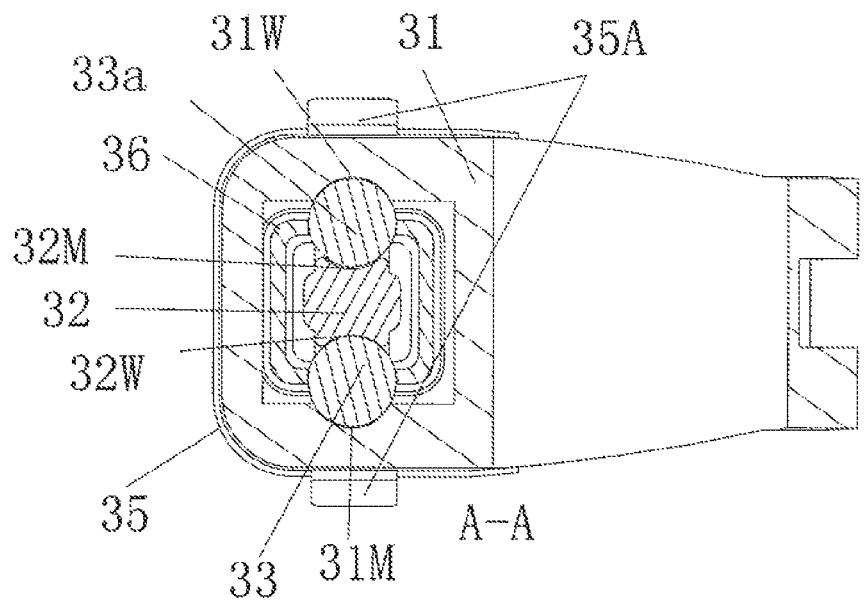
Figure 6E:
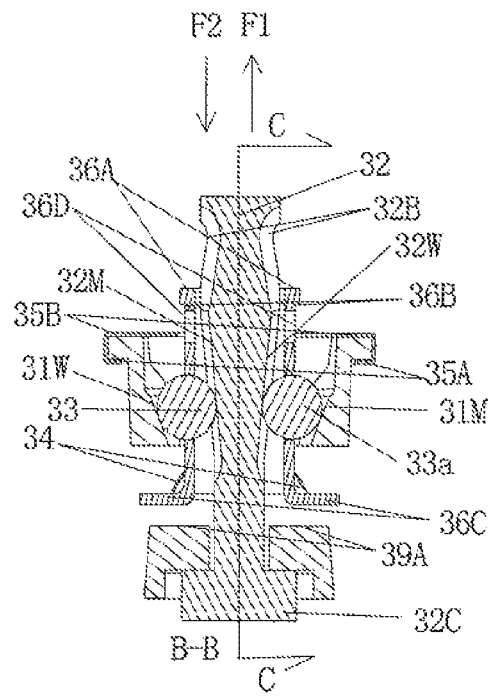
Figure 6F:
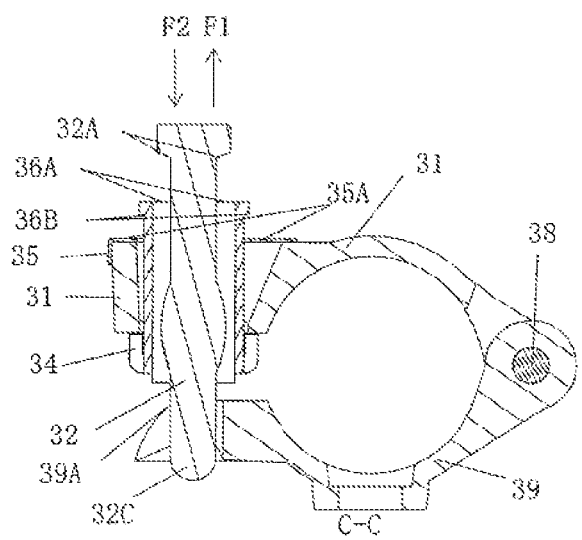

As shown in FIGS. 5A-5C, the self-locking device of the second embodiment is provided with a joint member 20, which is connected rotatably or detachably with a lower clamp arm of the device and used for joining the lower clamp arm with an upper clamp arm of the device to sandwich an object in the self-locking device, when the joint member 20 is engaged with and tightened by the locking member. The joint member 20 may have various shapes, e.g. a ring shape, a T shape connected with a ring, etc., to join the upper and lower clamp arms.

The upper and lower clamp arms, which are rotatably connected by a pin or formed integrally, are used for clamping an object in the self-locking device by means of the joint member 20.

For example, the self-locking device in the second embodiment may include a housing 21, a locking member 22, two lock blocks 23 and 23a, two springs 24, a spring retainer 25, a pin 26, a joint member 20, nuts 27 and a screw 25A for mounting the spring retainers.

The locking member 22 includes the second and third frictional contact faces 22M and 22W, a rotating tab 22C, and an engaging portion 22D for the joint member.

The housing 21 includes the first frictional contact face 21W and the fourth frictional contact face 21M.

The joint member 20 may be connected to the engaging portion 22D of the locking member to fasten an object.

The pin 26 fixed by the nuts 27 improves the effect of locking the self-locking device by an external force.

The nuts 27 fixing the pin 26 may be used as fulcrums for a lever to unlock the device.

Figure 3A:
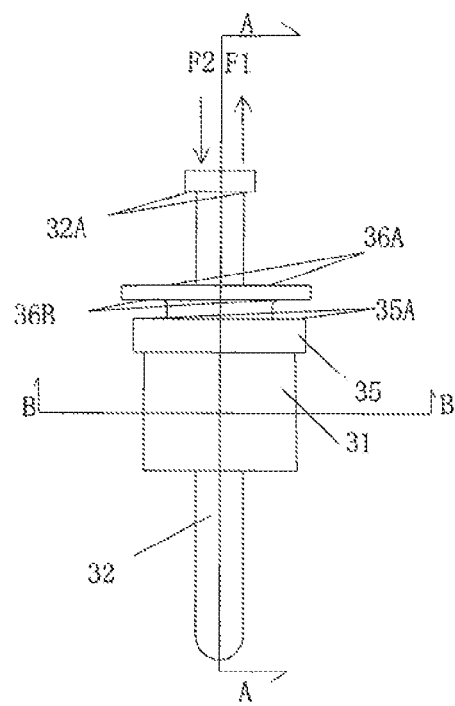
FIGS. 3A-3B show a front view and a sectional view along a line A-A of the self-locking device in the third embodiment, respectively.
Figure 3B:
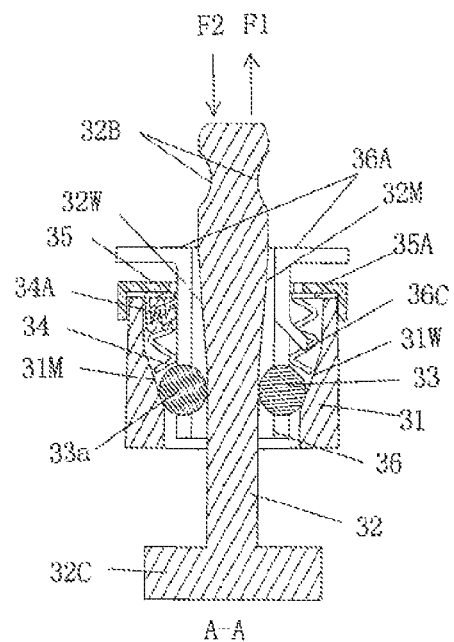
Figure 3C:
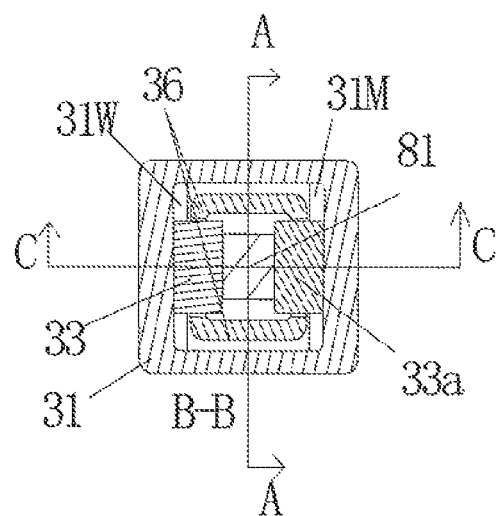
FIGS. 3C-3D show sectional views along lines B-B and C-C of the self-locking device in the third embodiment, respectively.
Figure 3D:
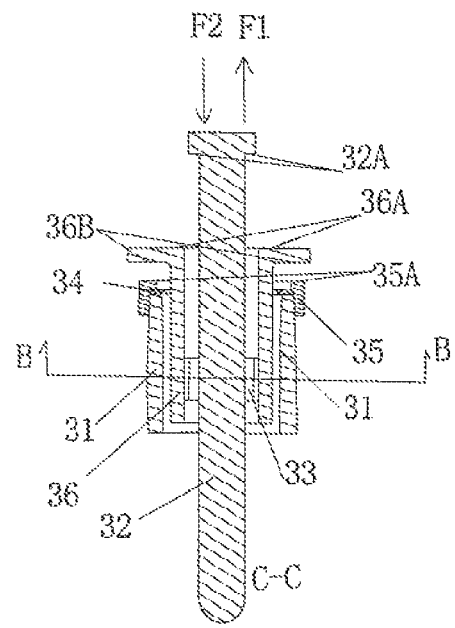

FIGS. 3A-3C shows structural representation of the preferable self-locking device in the third embodiment, which is a variant of the self-locking device in the second embodiment but with the same operation principle. The self-locking device in the third embodiment includes a housing 31, a locking member 32, two lock blocks 33 and 33a, and a lock block retainer (which is actuated to lock and unlock the device, as described below) 36, and preferably includes a holding member (including a set of springs 34), and more preferably includes a spring retainer 35 which may be a part of the housing 31. The self-locking device in the third embodiment is generally different from that in the second embodiment in that the locking member 32 of a different shape and an additional lock block retainer 36 are employed.

The locking member 32 includes frictional contact faces 32M and 32W (which are equivalent to the second and third frictional contact faces 12M and 12W shown in FIGS. 1C-1D). A prying face 35A, together with a prying face 36B on the lock block retainer 36, is provided for unlocking of the device.

The locking member may include a cap or head 32C, like the head of a bolt or T-shaped screw.

The locking member 32 functions the same as the locking member 22.

The lock blocks 33 and 33a (which are equivalent to the lock blocks 13 and 13a shown in FIGS. 1C-1D) may have a trapezoidal shape, a spherical shape, etc.

The springs 34 (the elastic force of which is equivalent to the force P shown in FIGS. 1C-1D) may be used for applying a pressing force on the lock block retainer 36, which in turn presses against the lock blocks 33 and 33a; or the springs 34 apply the pressing forces on the lock blocks 33 and 33a directly.

The spring retainer 35 supports the springs 34, guides the lock block retainer 36 to be moved substantially longitudinally within the housing, and prevents sundries from falling into the self-locking device.

The lock block retainer 36 prevents irregular movements of the lock blocks 33 and 33a and falling of the lock blocks 33 and 33a out from the housing when the locking member 32 is drawn away. Accommodating holes are provided in the wall of the lock block retainer 36 to accommodate the lock blocks 33 and 33a, and prevent the falling of the lock blocks 33 and 33a out from the housing when the locking member 32 is drawn away from the retainer 36. Preferably, the lock block retainer 36 includes a flange at its one end, and the self-locking device can be put in its locked state through the prying by a lever between a prying face 32A at an end of the locking member 32 and a pivot face 36A at the top of the flange of the lock block retainer 36. If the prying face 32A is lifted while the pivot face 36A is pressed down, the lock block retainer 36 presses down the lock blocks 33 and 33a, so that the lock blocks 33 and 33a are tightly pressed against the housing and the locking member, and any material deformation of the device is absorbed. If the prying face 36B is lifted through the prying by a lever, the lock block retainer 36 raises the lock blocks 33 and 33a to separate them from the respective frictional contact faces, so that the self-locking device is opened or unlocked.

A hook 36C protruding from a side of the lock block retainer 36 is used for keeping the self-locking device in its unlocked state. In use, when a tool 7B or 7C is used to pry the prying face 36B of the lock block retainer 36, the prying face 36B is moved away from the housing 31 and the spring retainer 35, and the hook 36C is raised above the housing 31 and the spring retainer 35, at this time, the lock block retainer 36 is pushed and inclined by a spring 34A arranged at a side of the lock block retainer 3 that is opposite to the hook 36C, so that the hook 36C rests on the top surface of the spring retainer 35 and the self-locking may be kept in its unlocked state. The self-locking device may be locked again after the hook leaves the top surface of the spring retainer 35.

The inner wall of the housing 31 includes two locking faces 31W and 31M (which are equivalent to the first and fourth frictional contact face 11W and 11M shown in FIGS. 1C-1D), and the springs 34 are limited within the housing 31 through the spring retainer 35.

The locking faces 32M and 32W at two opposite sides of the locking member correspond to the locking faces 31W and 31M in the housing 31, respectively, so that a lock block 33 may be sandwiched and move between the faces 31W and 32M and a lock block 33a may be sandwiched and move between the faces 31M and 32W. Preferably, the locking faces 31W and 32M and the locking faces 32W and 31M are shaped to substantially complementary with the lock blocks 33 and 33a, respectively, to increase the contact area between the locking faces and the lock blocks 33, 33a. The locking faces 31W and 31M in the housing 31 are designed such that the vertex of an angle α between the locking faces 31W and 32M or the vertex of an angle α' between the locking faces 31M and 32W points along the direction F1. If an angle between the locking faces 32M and 32W of the locking member 32 is denoted by γ, an angle between the locking faces 31W and 31M is denoted by θ, and $θ ≤ φ_1 + φ_2 + φ_3 + φ_4 + γ$, then the locking of the locking member may be achieved, to allow the locking member 32 to be moved in the direction F1 but locked in the opposite direction F2, where $φ_1$, $φ_2$, $φ_3$, and $φ_4$ denote frictional angles as above.

Preferably, the self-locking device may be structurally symmetrical along the longitudinal axial of the locking member 22 or 32, that is, α=α'.

Figure 4:
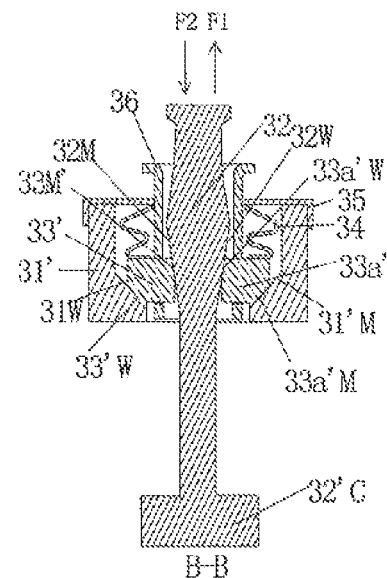
FIG. 4 shows a sectional view along a line B-B of a variant of the self-locking device in the third embodiment.

FIG. 4 illustrates a self-locking device with lock blocks of another shape. The lock blocks 33' and 33a' are in surficial contact with the locking member 32 and the housing 31 to increase the frictional contact areas and reduce deformation of the frictional contact faces.

The inclined first frictional contact face 33'W of the lock block 33' is in contact with the inclined first frictional contact face 31W of the housing 31', the inclined second frictional contact face 33'M of the lock block 33' is in contact with the inclined second frictional contact face 32M of the locking member 32, the inclined third frictional contact face 33a'W of the lock block 33a' is in contact with the inclined third frictional contact face 32W of the locking member 32, and the inclined fourth frictional contact face 33a'M of the lock block 33a' is in contact with the inclined fourth frictional contact face 31'M of the housing 31'. The lock block 23, 33 may each have a spherical shape, or a column shape with a circular, triangular, trapeziform, diamond, or irregular cross section.

That is, the shape of any of the first to fourth frictional contact faces of the locking member or housing of the self-locking device is designed to match the shape of the frictional contact face of the lock block, to obtain the maximal frictional contact area as possible.

FIGS. 6A-6F show a structural representation of a construction fastener with the self-locking, which includes a housing 31, a locking member 32, two lock blocks 33 and 33a, a spring 34, a spring retainer 35, a lock block retainer 36, a pin 38 and a lower base (also referred to as a lower clamp arm) 39 connected with the housing 31 through the pin 38.

The locking member 32 functions to connect the lower base. Particularly, the upper part of the locking member 32 is used to construct the self-locking device along with the housing 31 and so on, and the T-shaped lower part 32C (e.g. a T-shaped screw head) of the locking member 32 engages with and locks the lower base.

The second and third frictional contact faces 32M and 32W of the locking member 32 are equivalent to the second and third frictional contact faces 12M and 12W shown in FIGS. 1C-1D. The frictional contact faces are shaped to match with the locking member to increase the frictional area. Like the groove 22B, the groove 32B on the locking member 32 is used to accommodate the lock block 33 when the self-locking device is in its unlocked state, to prevent unintended locking of the locking member 32. Lifting the prying face 32A on the locking member 32 and meanwhile pressing the pivot face 36A on the lock block retainer 36 by a lever results in the locked state of the self-locking device. The groove 32B can be used for unlocking the self-locking device.

The lock blocks 33-33a are equivalent to the lock blocks 13-13a shown in FIGS. 1C-1D.

The wall of the lock block retainer 36 contains two slots for the lock blocks. When the pivot face 36A on the lock block retainer 36 is pressed and the prying face 32A on the locking member 32 is lifted by a tool 7B or 7C, the lock block retainer 36 pushes down the lock blocks 33 and 33a, which are respectively tightly sandwiched between the first and second frictional contact faces 31W and 32M and between the third and fourth frictional contact faces 31M and 32W, to achieve tight locking of the self-locking device. When the prying face 36B on the lock block retainer 36 is lifted from the prying face 35B on the spring retainer 35 by a lever, the lock block retainer 36 is lifted, causing the lock blocks 33 and 33a to be lifted towards the spring retainer 35 and release from the second and third frictional contact faces 32M and 32W of the locking member 32, so that the locking member 32 can move longitudinally, that is, the locking member 32 can move freely along the direction F2 or F1. Prying holes 36D in the wall of the retainer 36 function the same as the prying face 36B but require for a different tool. The self-locking device can also be unlocked by levering an end 36C of the lock block retainer 36 and the prying face 39A below.

The first and fourth frictional contact faces 31W and 31M of the housing 31 are equivalent to the first and fourth frictional contact faces 11W and 11M shown in FIGS. 1C-1D. The housing 31 and the spring retainer 35 may be fixedly engaged with each other or formed integrally.

A spring 34 presses against the lock block retainer 36, which in turn presses the lock blocks 33 and 33a against the respective frictional contact faces. The spring 34 may be alternatively arranged within the housing 31, and pressed between the spring retainer 35 and the lock blocks 33 and 33a as well as the lock block retainer 36. The force of the spring 34 is equivalent to the force P shown in FIGS. 1C-1D.

The lock block retainer 36 extends through the spring retainer 35, which ensures the substantially perpendicular movement of the lock block retainer 36 and prevents the entry of foreign objects into the self-locking device. The spring retainer 35 is fixedly engaged with the housing 31 by a buckling part 35A or any other means.

The pin 38 as a hinge part is used to connect the housing (i.e. an upper arm) with the lower base 39 of the self-locking device.

The inventive self-locking device may be used alone, or multiple self-locking devices may be combined.

The inventive self-locking device may be adapted for locking an object having a various shape such as a cylindrical shape to connect, fasten or seal the object.

For example, a preferable example of the self-locking device in the second embodiment is shown in FIGS. 5A-5C. The self-locking device may be used as a construction fastener, for example.

FIGS. 5A-5C show the self-locking device (i.e. a construction fastener) of the second embodiment, which includes a housing 21 (which is combined with an upper cover to form an upper clamp arm of the construction fastener), a locking member 22, two lock blocks 23 and 23a, two springs 24, a torsion spring 24A for the locking member 22, a joint member 20, a torsion spring 24B for the joint member 20, a spring retainer 25, pins 26 and 26A, nuts 27, a lower clamp arm 29 and an optional frictional pad 201.

The wall of a cavity of the housing 21 includes the first and fourth frictional contact faces 21W and 21M (which are equivalent to the first and fourth frictional contact faces 11W and 11M shown in FIGS. 1C-1D).

The lower clamp arm 29 includes: a joint member connector 29A for connecting the joint member, a hole 29B for hinging with the upper clamp arm, a frictional pad support 29C for supporting a frictional pad, a connecting part for connecting with another lower clamp arm, and a stop pole 29E for limiting the joint member.

The inventive construction fastener above is similar to conventional construction fasteners, but combines the self-locking device in the second embodiment with the upper clamp arm of the conventional fastener. The joint member 20 is hinged with the joint member connector 29A of the lower clamp arm through the torsion spring 24B. The upper clamp arm including the housing 21 is hinged with the lower clamp arm 29 through the pin 6A. The joint member 20 may be further rotated about the joint member connector 29A and engaged with the engaging portion 22D of the locking member.

The spring retainer 25 may be screwed or snapped on the housing 21, or may be a part of the housing 21.

Preferably, a frictional pad 201 is provided to increase the friction force between the fastener and an object (e.g. a pipe) locked by the fastener, thereby improve the locking stability of the fastener.

The torsion spring 24A is used to rotate the locking member to its initial position during the unlocking of the self-locking device, so that the joint member may be detached from the locking member 22.

The torsion spring 24B is used to, on one hand, tie the joint member 20 to the lower clamp arm, and on the other hand, draw the joint member 20 against the stop pole 29, when the joint member 20 is not locked.

The connecting part 29 of the lower clamp, arm 29, if available, is used to hinge with or is formed integrally with a lower clamp arm 29 of another fastener.

The self-locking device may include one or both of the torsion springs 24A and 24B.

Figure 7:
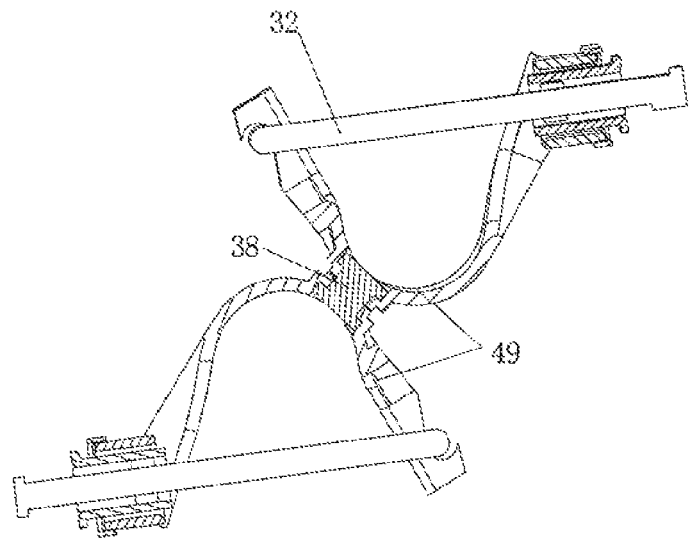
FIG. 7 shows a sectional view of a rotatable construction fastener embodying the self-locking device in the third embodiment.
Figure 8:
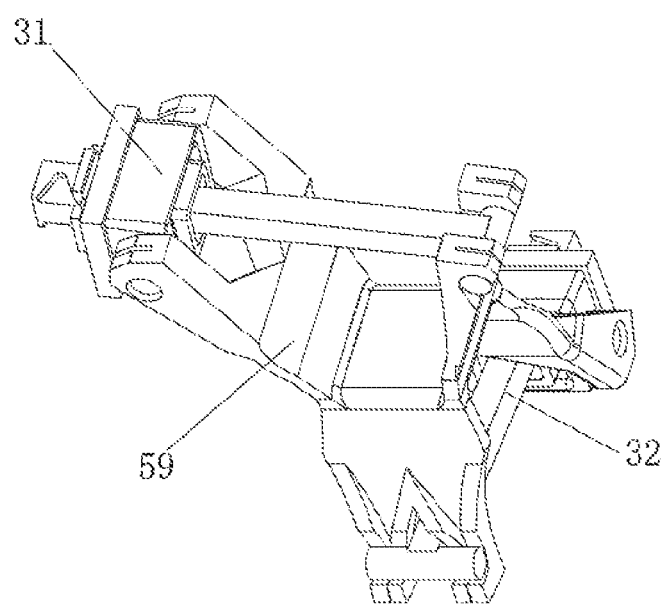
FIG. 8 shows a perspective view of a right-angle construction fastener embodying the self-locking device in the third embodiment.

FIGS. 7-8 show preferable examples of construction fasteners embodying the self-locking device in the third embodiment. The fastener includes a self-locking device, an individual fastening wrist 49 or a combined fastening wrist 59 and a pin 38. Please be noted that the features of the construction fastener including the self-locking device of the second embodiment may be combined with the features of the third embodiment. For example, the fastener of the third embodiment may also include an upper clamp arm and a lower clamp arm, which are not described again here.

The fastening wrist 49 may be formed integrally (including the upper clamp arm and lower clamp arm of the conventional fastener), or composed of the upper and lower clamp arms.

A right-angle fastener may include the combined fastening wrist 59 and two self-locking devices.

Figure 9A:
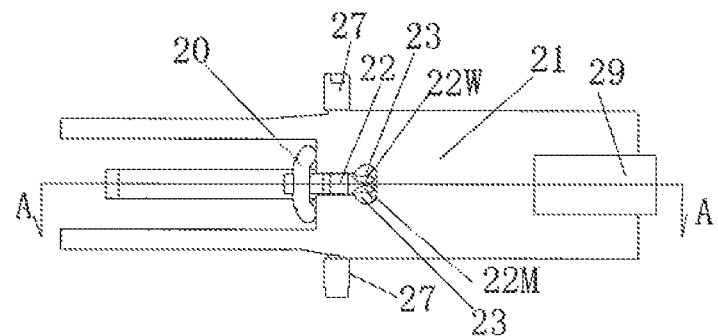
FIGS. 9A-9C respectively show a front view, a sectional view along a line A-A and a sectional view along a line B-B of a plier-type fastener embodying the self-locking device in the second embodiment.
Figure 9B:
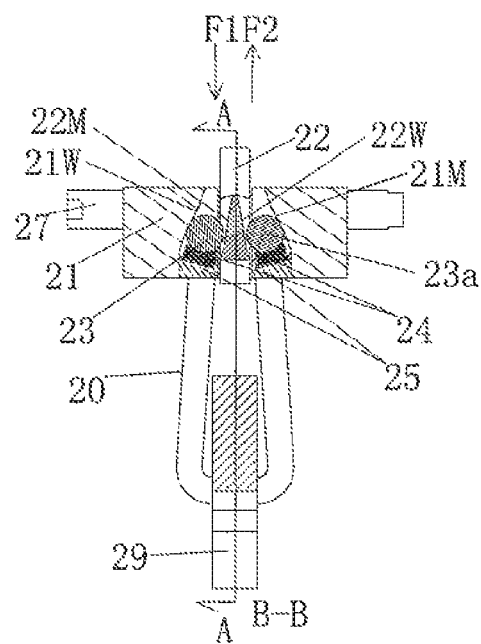
Figure 9C:
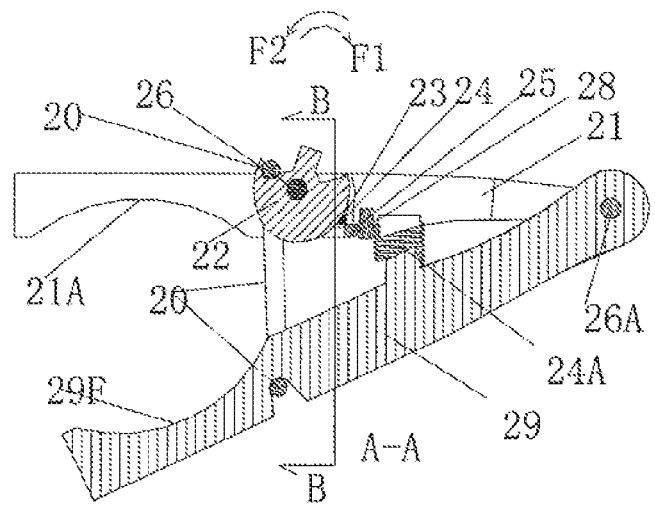

FIGS. 9A-9C show an example of an variant (i.e. a plier-type fastener) including the self-locking device in the second embodiment, and the plier-type fastener includes a housing 21 integrated with an upper clamp arm, a locking member 22, two lock blocks (23, 23a), two springs (24, 24A), a spring retainer 25, a nut 27, a lower clamp arm, a joint member 20, and a pin (26, 26A).

As shown, the housing 21 includes an upper locking concave 21A, while the lower clamp arm 29 includes a matching lower locking concave 29F.

The engagement of the upper locking concave 21A with the lower locking concave 29F can fasten various objects, and the locking concaves 21A and 29F may have different shape depending on the target object to be fastened.

The spring 24A drives the housing 21 and the lower clamp arm 29 away from each other.

The locking and unlocking principles of the plier-type fastener are substantially the same as those of the above fastener, for example, as shown in FIGS. 1A-2D.

The plier-type fastener may be used alone or with another plier-type fastener.

Figure 10:
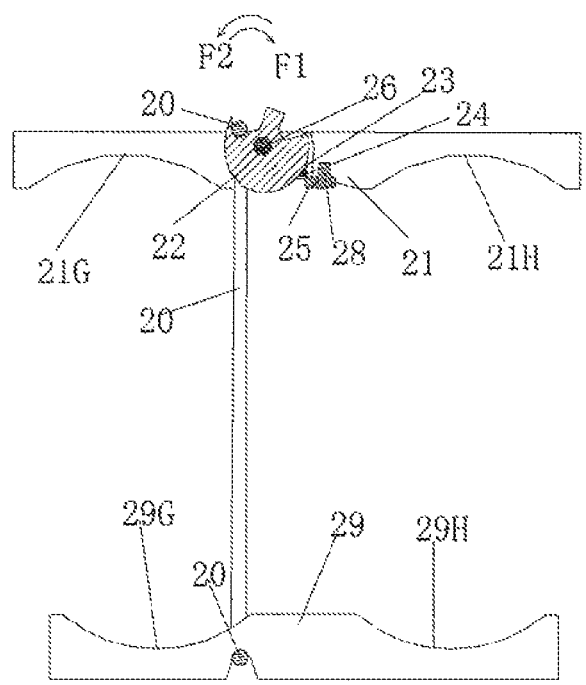
FIG. 10 shows a sectional view of a gripper-type fastener embodying the self-locking device in the second embodiment.

A gripper-type fastener shown in FIG. 10 includes a housing 21 combined with an upper clamp arm, a locking member 22, two lock blocks (23, 23a), two spring 24, a spring retainer 25, a nut 27, a pin 28, a lower clamp arm 29, and a joint member 20.

The housing 21 includes a first locking concave 21G and a second locking concave 21H.

The lower clamp arm 29 includes a first locking concave 29G and a second locking concave 29H. The lower clamp arm 29 may also include only one locking concave. Alternatively, the joint member 20 may be used for fastening an object if there is no such lower clamp arm 29.

The gripper-type fastener may include one or more self-locking devices.

The locking and unlocking tool 7A dedicated for locking and unlocking the second embodiment of the self-locking device is shown in FIG. 11A. The tool 7A includes an unlocking end 72 and a locking end 74. To unlock the self-locking device, two hooks 78 at the unlocking end 72 hook the nuts 27 which are also used as fulcrums, and two pressing points 76 of the tool 7A rest on the two lock blocks of the self-locking device and then drive the lock blocks to be detached from the respective frictional contact faces due to the rotation of the tool 7A, so that the locking member 22 is unlocked. To lock the self-locking device, the locking end 74 is engaged with a tab of the locking member and rotated along the locking direction F1, so that the locking member may be held at any continuous locked position.

The locking and unlocking tools 7B-7C dedicated for locking and unlocking the self-locking device of the third embodiment are shown in FIGS. 11B-11C.

Locking prying points 71 of the tools 7B-7C are used for contacting the pivot faces 32A while locking pivot points 73 of the tools 7B-7C are used for contacting the prying faces 36A, and levering of the tools 7B-7C can lock the self-locking device.

Unlocking prying points 75 of the tools 7B-7C are used for contacting the prying faces 36B while unlocking pivot points 77 of the tools 7B-7C are used for contacting the prying faces 35B, and levering of the tools 7B-7C can unlock the self-locking device.

The tools 7B-7C may have other various structures, as long as the tools can be used to press the lock block retainer 36 while lifting the locking member 32, or lift the lock block retainer 36 while pressing the housing 31.

The tools 7A-7C may be hydraulic or pneumatic depending on demands by the self-locking devices in the second and third embodiments, or even integrated with the housing of the self-locking device.

Table 1 below shows a list of reference numerals.

| Terms | Numerals |
|---|---|
| First frictional contact face | W, 11W 21W, 31W |
| Second frictional contact face | M, 12M, 22M, 32M |
| Third frictional contact face | 12W, 22W, 32W |
| Fourth frictional contact face | 11M, 21M, 31M |
| Housing | 1, 11, 21, 31 |
| Locking member | 2, 12, 22, 32 |
| Lock block 1 | 3, 13, 23, 33, 33' |
| Lock block 2 | 3a, 13a, 23a, 33a, 33a' |
| Spring | 24, 24A, 34, 34A |
| Spring retainer | 25, 35 |
| Pin | 26, 26A, 38 |
| Nut | 27 |
| Screws for fixing spring retainers | 28 |
| Lower clamp arm | 29, 39 |
| Joint member | 20 |
| Screw hole | 21C |
| Upper locking concave | 21A |
| First locking concave of upper clamp arm | 21G |
| Second locking concave of upper clamp arm | 21H |
| Central hole | 22E |
| Open groove on locking face | 22B, 32B |
| Tab | 22C |
| Engaging portion | 22D |
| Joint member connector | 29A |
| Hinging hole | 29B |
| Frictional pad support | 29C |
| Connecting part for another lower clamp arm | 29D |
| Stop pole for joint member | 29E |
| Lower locking concave | 29F |
| First locking concave of lower clamp arm | 29G |
| Second locking concave of lower clamp arm | 29H |
| Locking prying face of tool | 32A |
| Head (or T-shaped head) | 32C |
| First frictional contact face of lock block 1 | 33'W |
| Second frictional contact face of lock block 1 | 33'M |
| Third frictional contact face of lock block 2 | 33a'W |
| Fourth frictional contact face of lock block 2 | 33a'M |
| Buckling part | 35A |
| Prying face | 35B |
| Lock block retainer | 36 |
| Pivot face | 36A |
| Prying face | 36B |
| Unlocking end | 36C |
| Prying hole | 36D |
| Unlocking groove | 36E |
| Lower base ( lower clamp arm) | 39 |
| Unlocking pivot face (or prying point) | 39A |
| Fastening wrist | 49 |
| Combined fastening wrist | 59 |
| Dedicated tool | 7A, 7B, 7C |
| Frictional pad | 201 |
| Unlocking end | 72 |
| Locking end | 74 |
| Pressing point | 76 |

-continued

| Terms | Numerals |
|---|---|
| Hook | 78 |
| Unlocking pivot point | 77 |
| Unlocking prying point | 75 |
| Locking Prying point | 71 |
| Locking pivot point | 73 |

The preferable embodiments of the invention have been described, but the invention is not limited thereto. Various modifications and alterations to the invention may occur to those skilled in the art, and all such modifications and alterations fall into the scope of the invention, without departing from the principle of the invention.

What is claimed is:

1. A self-locking device with continuous locking positions, comprising:
a housing with an internal cavity, wherein a wall of the cavity includes a first frictional contact face and a fourth frictional contact face;
a locking member with a second frictional contact face and a third frictional contact face, which is movable in the cavity, with the second and third frictional contact faces facing the first and fourth frictional contact faces, respectively; and
a first lock block and a second lock block, with the first lock block being arranged between and contacting with the first and second frictional contact faces, and the second lock block being arranged between and contacting with the third and fourth frictional contact faces;
wherein, the first and second lock blocks are configured to allow the locking member to be movable with respect to the housing in a first direction but locked in a second direction opposite to the first direction, so that the locking member is locked at any continuous locking position;
the device further comprises:
an upper clamp arm, one end of which is connected fixedly with or formed integrally with the housing; and
a lower clamp arm, one end of which is movably connected with the other end of the upper clamp arm;
wherein, the locking member extends through the cavity of the housing, and one end of the locking member is engaged with the other end of the lower clamp arm when the locking member is locked at the locking position, so that the upper and lower clamp arms are fastened together.

2. The device of claim 1, wherein the first frictional contact face forms an angle $\alpha$ with respect to the second frictional contact face, the fourth frictional contact face forms an angle $\alpha'$ with respect to the third frictional contact face, and $\alpha \leq \phi_1 + \phi_2$ and $\alpha' \leq \phi_3 + \phi_4$, where $\phi_1$ and $\phi_2$ denote a frictional angle between the first lock block and the first frictional contact face and that between the first lock block and the second frictional contact face, respectively, and $\phi_3$ and $\phi_4$ denote a frictional angle between the second lock block and the third frictional contact face and that between the second lock block and the fourth frictional contact face, respectively.

3. The device of claim 2, wherein the first and fourth frictional contact faces are symmetrical about a longitudinal axis of the housing, the second and third frictional contact faces are symmetrical about a longitudinal axis of the locking member, and a=a'.

4. The device of claim 2, further comprising a holding member, which is used for applying forces on the first and second lock blocks, so that the first lock block is in contact with the first and second frictional contact faces and the second lock block is in contact with the third and fourth frictional contact faces.

5. The device of claim 4, wherein the holding member includes a spring and a lock block retainer extending through the cavity, the locking member extends through the lock block retainer, and a wall of the lock block retainer includes a first hole for accommodating the first lock block and a second hole for accommodating the second lock block;
an end of the lock block retainer is provided with a flange, and the spring is arranged external to the housing and pressed between the housing and the flange to apply an elastic force on the lock block retainer.

6. The device of claim 4, wherein the holding member includes two springs and a lock block retainer extending through the cavity, the locking member extends through the lock block retainer, and a wall of the lock block retainer includes a first hole for accommodating the first lock block and a second hole for accommodating the second lock block;
the springs are arranged within the cavity and used for applying elastic forces on the first and second lock blocks, respectively.

7. The device of claim 2, wherein the housing, the locking member, and the first and second lock blocks are made of steel.

8. The device of claim 2, wherein, $0 < \alpha \leq 17°$ or $0 < \alpha' \leq 17°$.

9. A self-locking device with continuous locking positions, comprising:
a housing with an internal cavity, wherein a wall of the cavity includes a first frictional contact face;
a locking member with a second frictional contact face, which is arranged at least partially in the cavity, with the second frictional contact face facing the first frictional contact face; and
a lock block, which is arranged between and contacts with the first and second frictional contact faces;
wherein, the lock block allows the locking member to be movable with respect to the housing in a first direction but locked in a second direction opposite to the first direction, so that the locking member is locked at any continuous locking position;
the device further comprises:
an upper clamp arm, one end of which is connected fixedly with or formed integrally with the housing; and
a lower clamp arm, one end of which is movably connected with the other end of the upper clamp arm;
wherein, the locking member extends through the cavity of the housing, and one end of the locking member is engaged with the other end of the lower clamp arm when the locking member is locked at the locking position, so that the upper and lower clamp arms are fastened together.

10. The device of claim 9, wherein the first frictional contact face forms an angle $\alpha$ with respect to the second frictional contact face, and $\alpha \leq \phi_1 + \phi_2$, where $\phi_1$ and $\phi_2$ denote a frictional angle between the lock block and the first frictional contact face and that between the lock block and the second frictional contact face, respectively.

11. The device of claim 10, wherein, $0 < \alpha \leq 17°$.

12. The device of claim 10, further comprising a holding member, which is used for applying a force on the lock block, so that the lock block is in contact with the first and second frictional contact faces.

13. The device of claim 10, wherein the housing, the locking member, and the lock blocks are made of steel.

\* \* \* \* \*